United States Patent [19]
Roff

[11] Patent Number: 5,454,957
[45] Date of Patent: Oct. 3, 1995

[54] CLOSED LOOP SYSTEM AND METHOD OF PROCESSING CUTTINGS

[76] Inventor: John W. Roff, Jr., P.O. Box 881-7, Conroe, Tex. 77305

[21] Appl. No.: 49,124

[22] Filed: Apr. 19, 1993

[51] Int. Cl.$^6$ ............................................ B01D 37/00
[52] U.S. Cl. .................... 210/768; 210/799; 210/800; 210/806; 210/97; 210/DIG. 5; 210/167; 210/202; 210/195.1; 175/66; 134/25.1
[58] Field of Search ................... 210/769, 780, 210/806, 97, 104, 195.1, 257.1, 388, DIG. 5, 521, 167, 521, 768, 799, 800, 195.1, 257.1, 202; 175/66; 134/25.1

[56] References Cited

U.S. PATENT DOCUMENTS

| | | | |
|---|---|---|---|
| 3,737,037 | 6/1973 | Bone, III | 175/66 |
| 4,208,285 | 6/1980 | Sample, Jr. | 210/180 |
| 4,315,822 | 2/1982 | Jaisinghani | 210/DIG. 5 |
| 4,599,117 | 7/1986 | Luxemburg | 210/708 |
| 4,606,283 | 8/1986 | DesOrmeaux et al. | 110/250 |
| 4,726,301 | 2/1988 | DesOrmeaux et al. | 110/250 |
| 4,793,423 | 12/1988 | Knol | 210/806 |
| 5,039,425 | 8/1991 | Caris et al. | 210/DIG. 5 |
| 5,066,407 | 11/1991 | Furlow | 210/521 |
| 5,236,585 | 8/1993 | Fink | 210/521 |

Primary Examiner—Robert A. Dawson
Assistant Examiner—Ana M. Fortuna
Attorney, Agent, or Firm—David M. Ostfeld

[57] ABSTRACT

A closed loop system for processing the effluent of drilling mud, cuttings, diesel, water and ultrafines includes a first mechanism for separating the cuttings from the mud, ultrafines and diesel utilizing washing fluid and shaking mechanisms. A second system is also provided to separate the majority of the diesel and water and ultrafines into water and diesel and ultrafines separately.

8 Claims, 4 Drawing Sheets

5,454,957

1

CLOSED LOOP SYSTEM AND METHOD OF PROCESSING CUTTINGS

FIELD OF THE INVENTION

The invention relates to a drilling mud processing and cleaning system, and particularly to a closed loop system.

BACKGROUND OF THE INVENTION

In the drilling of oil wells, the use of mud in the operations of the drilling have been known for many years. The return of this mud from the hole where the drilling occurs includes cuttings and other materials that are not or were not part of the mud. In an oil based mud drilling operation, there are two liquids (diesel and water) that normally become waste and are environmentally hazardous. When drilling with oil based mud, the drilling rig must be washed with diesel in order not to contaminate the mud with water. The Triplex pumps normally used in such systems are cooled with water that mixes with the diesel from rig wash.

It is well known in the art that after mud cleaners have been applied to the cuttings, the cuttings are dumped in the disposal pit. Thus, unclaimed mud, diesel and other effluents from the well may be dumped into a pit with significant pollution. Mud cleaners usually are a large tub with an agitator where wash solution may be applied.

It is an object of the present invention to have a closed system with regard to the mud, water and diesel produced by the drilling operations so that they are separated from the cuttings produced in the drilling process and are not otherwise dumped into the environment as in the prior art.

SUMMARY OF THE INVENTION

The present invention discloses a closed looped drilling system with respect to muds and fluids introduced into a drilling well. A first part of this system takes mud and cuttings produced by shale shakers, mud tanks, mud cleaners and through a series of cleanings, this part of the system thoroughly cleans all the cuttings which without pollutants are dumped to a disposal pit and otherwise through mechanical separation and washing cleans the cuttings and processes the fluids into a closed looped washing system and a return of mud, water, and diesel. The second portion of the system traps fluids and through a process similar to the settling and fluid processing, separates diesel and water from contaminants, returning the water and the diesel for further use with the drilling process.

BRIEF DESCRIPTION OF THE DRAWINGS

For a further understanding of the nature and objects of the present invention, reference is made to the following drawings in which like parts are given like reference numerals and wherein.

DESCRIPTION OF THE PREFERRED EMBODIMENT

Figure 1:
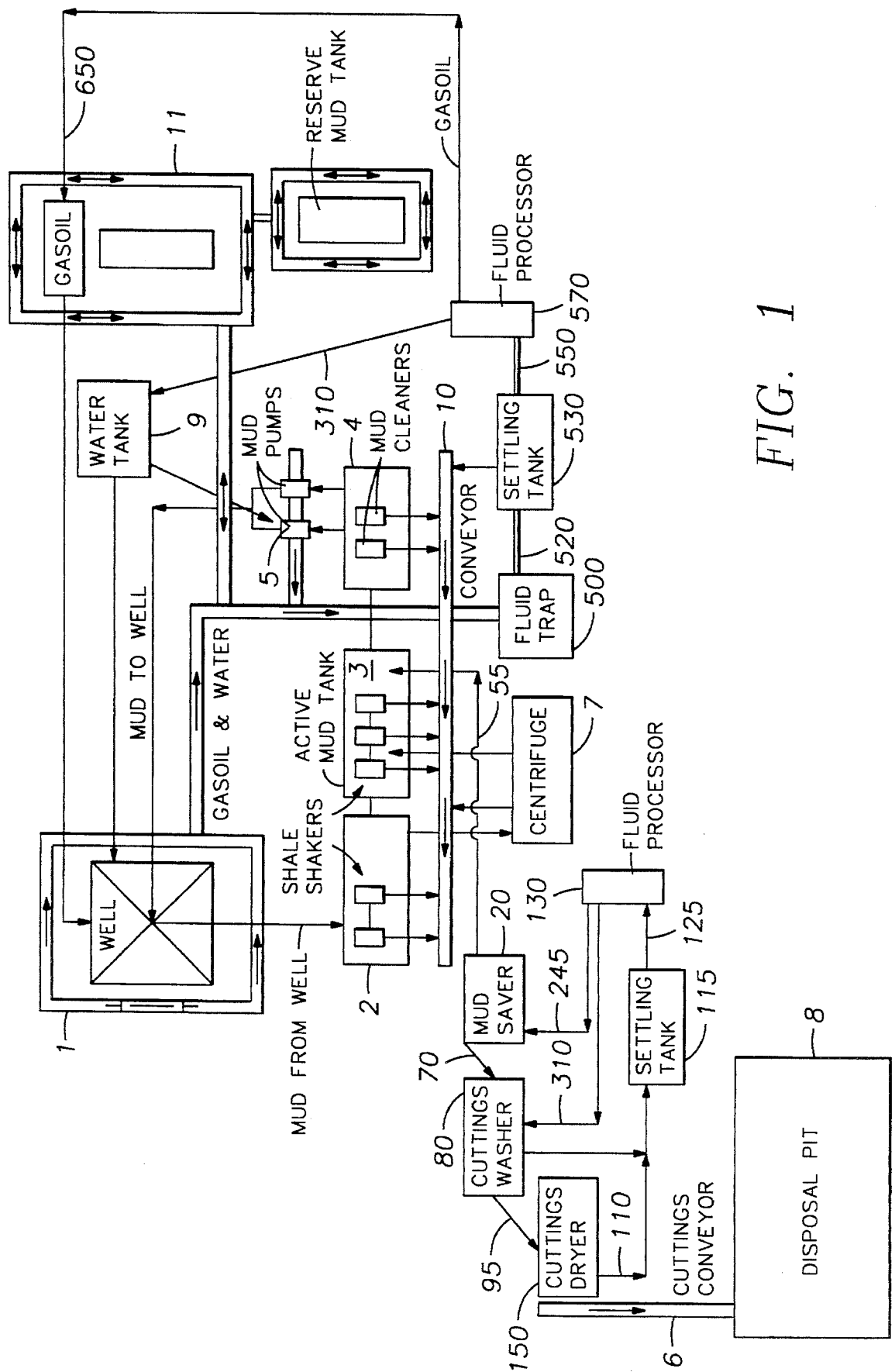
FIG. 1 is a overall flow sheet of the closed loop system of the preferred embodiment of the present invention.

As shown in FIG. 1, a rig 1 produces mud which is introduced in the shale shakers 2. The mud effluent from the shale shakers 2 travels to the active mud tanks 3 as is well known in the art. The mud effluent from the mud cleaners 4 also travels to the active mud tanks 3, as is also well known in the art. Mud pumps 5 connected to the mud cleaner 4 convey the mud back to the rig 1 but also convey fluids to fluid trap 500. In the prior art, the effluent waste from the shale shakers 2, active mud tanks 3 and mud cleaners 4 are dumped into a disposal pit (not shown). In the present invention, waste effluents from the shale shakers 2, active mud tanks 3 and mud cleaners 4 are sent by conveyor 10 to mud saver 20. In the prior art and in the current invention a centrifuge 7 also cleans some of the effluent from the shale shakers 2 for reintroduction into the active mud tanks 3 and conveyor 10.

Figure 2:
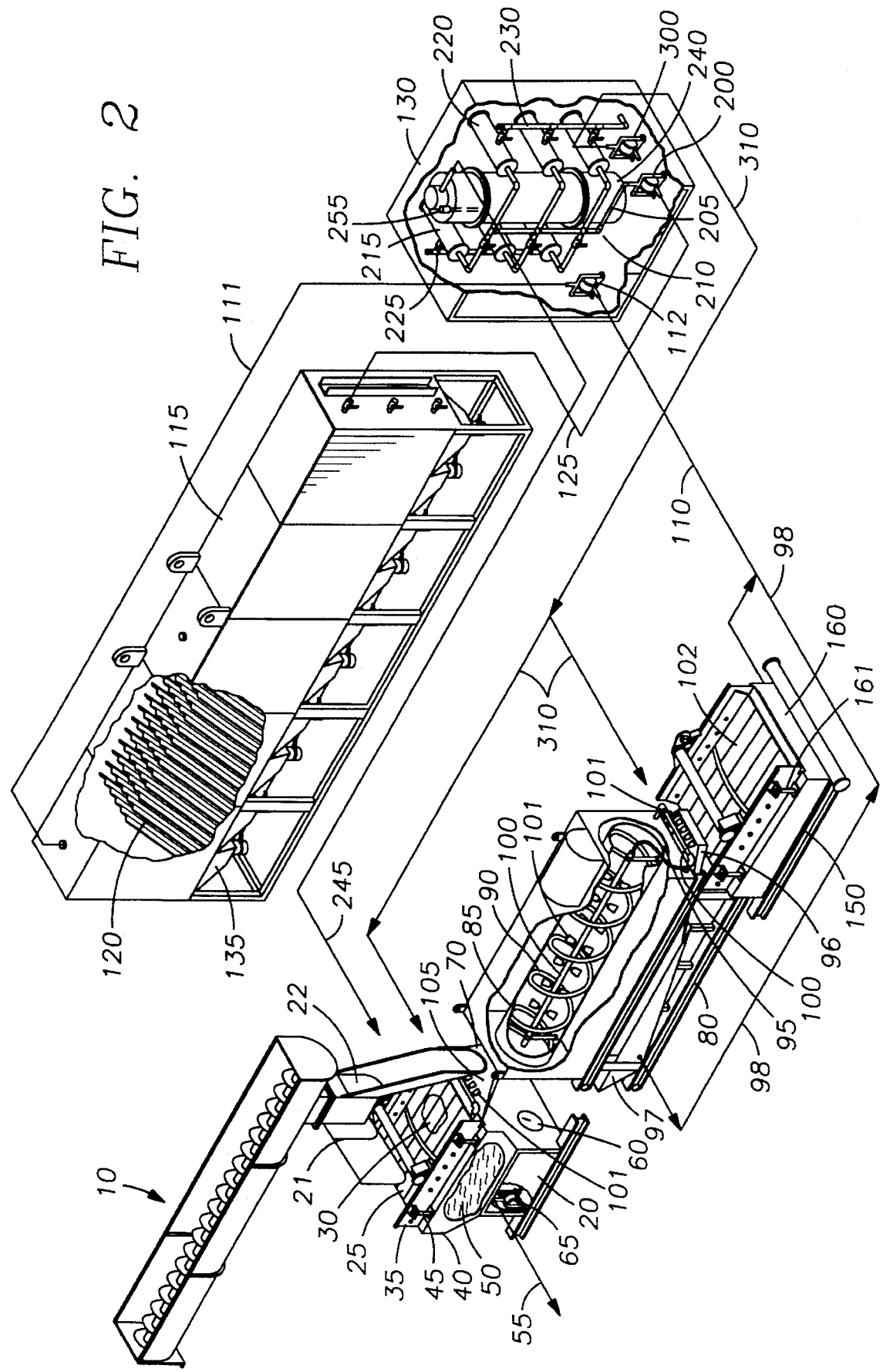
FIG. 2 is a representational drawing of the components of the cuttings washer system of the preferred embodiment of the present invention.

As shown in FIGS. 1 and 2, all cuttings including entrained mud and liquid effluents that are discharged from shale shakers 2, mud cleaners 4, and centrifuge 7, are discharged onto a discharge conveyor 10 which in turn empties onto mud saver 20. Mud saver 20 includes a special conveyor assembly having two doors 21, 22. The first door 21 opens onto a screen assembly 35 of mud saver 20. The second door 22 opens to a chute or slide 70 which is at the exit of mud saver 20, as discussed below. Door 21 is open during normal operation and door 22 is closed. However, if one of the screens of screen assembly 35 breaks, then it is necessary to bypass mud saver 20. Bypassing mud saver 20 should not shut the rig 1 down. Therefore, cuttings must continue to be accommodated. To do so, door 21 is closed and door 22 is open so that the cuttings are introduced downstream of mud saver 20.

Mud saver 20 also includes as a part of the screen assembly 35 an upper screen 25 and a lower screen 30 (shown in cutaway below screen 25). Typically screen 25 will be a 60-mesh screen whereas screen 30 will be a 200-mesh screen. The reason for the difference in mesh is that the feed of the initial cuttings and mud mixture come from a variety of screenings, and therefore it is necessary to remove both larger material and fine material. Screen 25 receives the initial particles (not shown) which come from screen sizes of 60 to 100 screen mesh, for shakers 2, through screen sizes of 200 to 250 screen mesh, for the mud screening process of mud cleaners 4. Screen 25 is required to have a mesh of 60 mesh to screen out the larger particles, and screen 30 is required to have a screen size of 200 mesh to screen out the finer particles to produce the resultant mud 50.

A tank 40 is supplied underneath the screens 25, 30 and is connected by springs 45 to screen assembly 35. Thus, the screens 25, 30 vibrate while the tank 40 receives mud 50 coming from screen 30. The mud 50 contained in the tank 40 after vibration is pumped by a pump 65 that receives the discharge from tank 40 and pumps it through line 55 back to the active mud system through active mud tanks 3 as mud having been screened through 200-mesh screen. A counter 60 (FIG. 2) is provided associated with the pump 65. Counter 60 measures the number of strokes of pump 65, thereby giving the operator an indication of how much mud is being saved.

As shown in FIGS. 1 and 2, the outlet of the mud saver 20 is a set of particles discharged by slide 70 to cuttings washer 80. Cuttings washer 80 is cylindrical in shape having outer cylinder 85 suspended on roller bearings and roller stop guides inside it which surrounds an inverted screw or auger 90 which conveys the particles from slide 70 to the other discharge end 95 of cuttings washer 80.

Cylinder 85 of cuttings washer 80 slowly rotates as the particles progress from slide 70 to discharge end 95. A series of spray barbs 101 connected to wash line 100 are provided in the interior of the cylinder 85 of cuttings washer 80 and spray wash solution onto the cuttings. Also the same wash solution is sprayed by spray barbs 101 at discharge 105 of mud saver 20 to aid the particles to slide down slide 70.

Figure 3:
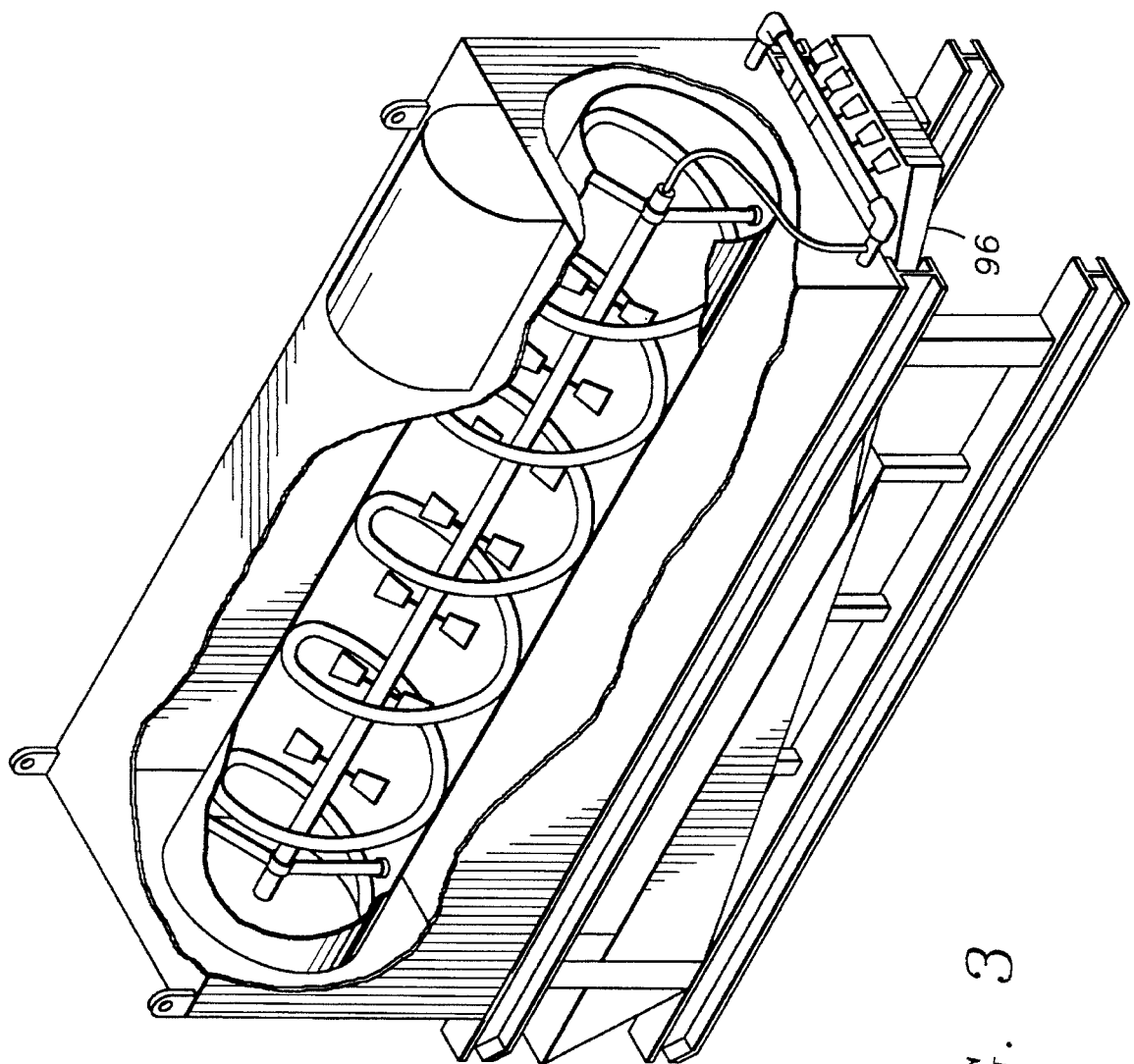
FIG. 3 is a detailed view of a portion of the cuttings washer of the preferred embodiment of the present invention for alternate use when screens of the shaker dryer break.

Cuttings washer 80 is also provided with chute 96. Chute 96 is movable from the position shown in FIG. 2 to a position (FIG. 3) where it extends to the discharge 95 of cuttings washer 80. Thus, if shaker dryer 150, discussed below, is not in commission, because of a screen break of screens 102, chute 96 may be put in place to catch the effluent. Fluids from discharge 95 are collected in container 97 and pumped through line 98 to the inlet 110 of pump 112 as discussed below. The cuttings remaining in container 97 may be mechanically delivered or hand shoveled onto conveyor or chute 70 at such time as shaker dryer 150 is again placed into service.

The wash solution from line 100 as introduced to the cuttings by spray barbs 101 is collected in a tank 160 of a shaker dryer 150, as shown in FIGS. 1 and 2. Tank 160 is mounted by springs 161 to the screens 102. As shown in FIGS. 1 and 2, the particles from the discharge 95 of cuttings washer 80 with the wash solution are discharged onto a single shaker dryer 150. Dryer 150 dries off any remaining solution, which solution also drops through the screens 102 into the tank 160 of shaker dryer 150. The dried cuttings are discharged from shaker dryer 150 to cuttings conveyor 6 (FIG. 1) which conveys the cuttings to disposal pit 8.

As shown in FIG. 2, the dirty wash solution in tank 160 is pumped through line 110 by pump 112 housed in fluid processor 130, and discharges through line 111 (FIG. 2) to settling tank 115. Line 111 discharges the washing fluid into settling tank 115 (FIG. 6) such that the fluid impinges on coalescing plates 120 mounted in the interior of settling tank 115, and then drops to the bottom of settling tank 115. As shown in FIGS. 1 and 2, the fluid is then discharged by discharge line 125 into fluid processor 130. As a result of settling, ultra-fine solids are collected in traps 135 provided in settling tank 115 and can be discharged manually as clean waste as they become full. Coalescing plates 120 help the water, wash fluid and diesel separate.

As shown in FIG. 2, the discharge from line 125 into fluid processor 130 is via pump 200 which has line 125 as its inlet. The discharge of pump 200 is through line 205 to the inlet 210 of filter system 215 or filter system 220. The liquid discharge from line 125 which flows through inlet 210 and then through either filter system 215 or filter system 220 enters either discharge manifold 225 or discharge manifold 230, respectively, to the bottom 240 of fluid processor 130. Fluid in bottom 240 will eventually fill all of fluid processor 130.

Fluid processor 130 has coalescing plates, such as plates 585 (FIG. 4), to permit the diesel entrained in the wash fluid to separate from the water and other soaps such that the diesel floats above the water and other material of that sort to the top of processor 130. A switch 255 is supplied at the top of fluid processor 130 that permits diesel to flow to line 245 as the discharge of diesel from fluid processor 130 to tank 40 in mud saver 20. Switch 255 also activates pump 300 thus preventing water from reaching the top of fluid processor 130. When switch 255 activates pump 300, the soapy water in fluid processor 130 is discharged by pump 300 through line 310 to cuttings washer spray 100 of cuttings washer 80 and discharge 105 of mud saver 20 where it is again used as the cleaning fluid or wash solution. Switch 255 will stop pump 300 before fluid processor 130 is completely empty of water.

Filters 215, 220 are used to filter out solids that may be in the fluid introduced through inlet 210. The two banks of filters 215, 220 are hand cleaned. Therefore, there are two banks 215, 220 so that one set may be operating while the other is being cleaned for which appropriate valving is applied.

Thus this closed loop system avoids having to have a pit where cuttings, diesel, some mud, and water are all dumped as part of the process in a waste that is not biodegradable.

Figure 4:
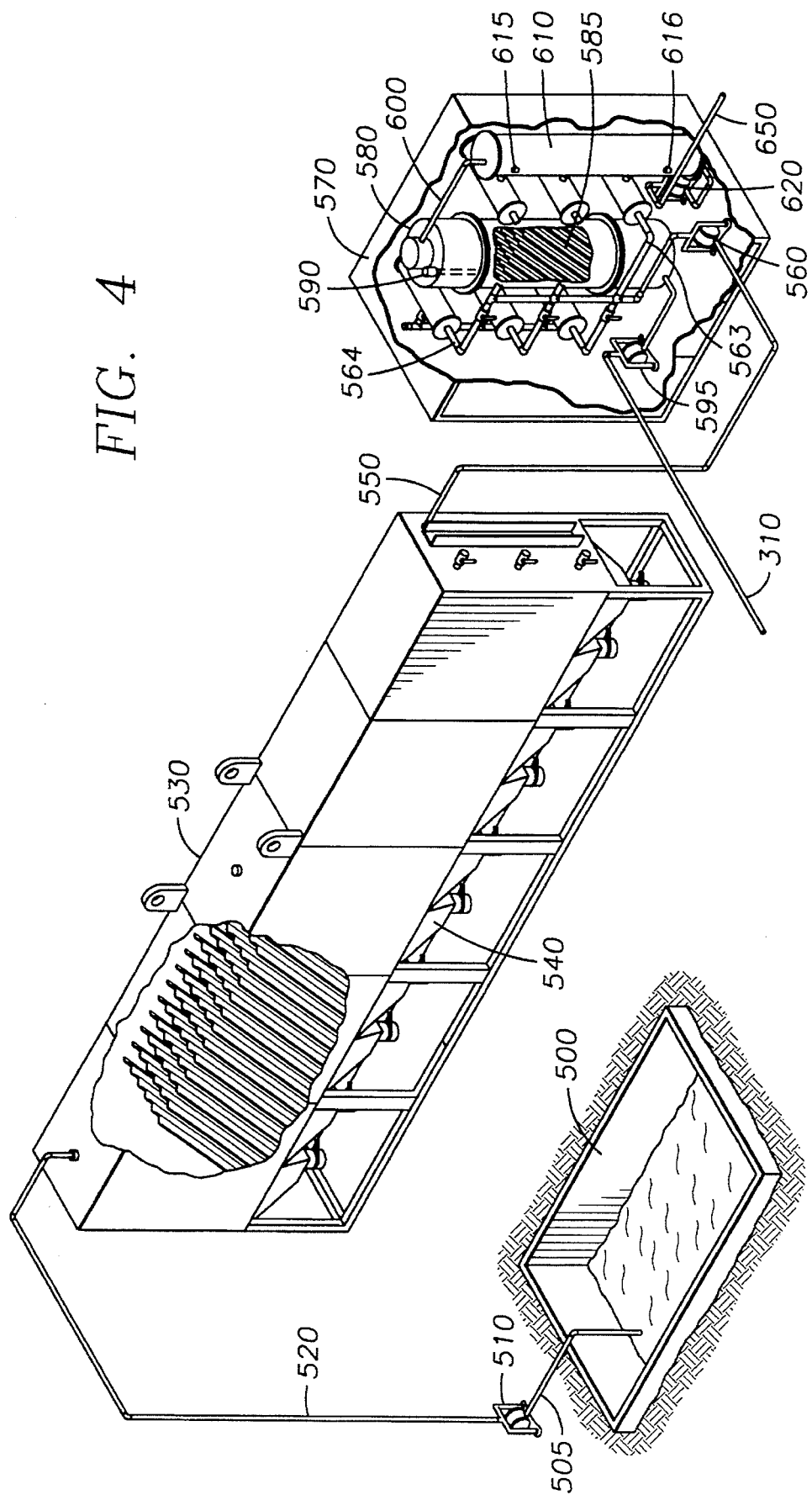
FIG. 4 is a an elevated view of the fluid processing system which is a combination of the fluid trap, settling tank and fluid processor for use with the closed loop system for reclaiming diesel and water of the preferred embodiment of the present invention.

As shown in FIGS. 1 and 4, diesel and water discharged from the drilling operation of rig 1 are introduced into a fluid trap 500 which collects the fluids from the drilling operation. Fluid trap 500 has an overflow or discharge line 505 where it is introduced into the inlet of pump 510 which pumps fluid through line 520 to a second settling tank 530 which is identical to the above described settling tank 115, except that is has a larger capacity, such as forty barrels, which separates diesel, water and solids. If separation is sufficiently complete, then fluids may be pumped directly (not shown) to storage. Solids from settling tank 530 are removed manually from traps 540 and transferred to conveyer 10 of the cuttings washer system.

Fluid is continuously discharged from settling tank 530 through line 550 of settling tank 530. The discharge line 550 provides the inlet feed to pump 560 in a fluid processor 570 which is in two parts. The first part is substantially identical to fluid processor 130 except sized for larger capacity and has coalescing plates 585 and discharges in a different manner. Further, the discharge 310 from fluid processor 570 does not have soaps associated with it but is water used to supply rig 1 and mud pumps 5 through a water tank 9. Thus, fluid is pumped into either filter manifold 564 or filter manifold 563 and then enters fluid processor separator vessel 580 at the bottom of vessel 580, eventually filling all of separator vessel 580. Vessel 580 has coalescing plates 585 to accelerate the separation of diesel and water. A fluid switch 590 at the upper part of separator vessel 580 permits diesel to flow but will not permit water to flow past this point. When water reaches switch 590, it activates pump 595, thus pumping water from vessel 580 but will not pump the vessel dry.

The diesel discharge from fluid processor 570 is introduced back into the diesel system 11 for rig 1. To achieve this, the diesel flows from the top of vessel 580 through line 600 to tank 610. When tank 610 is full, a fluid level switch 615 activates pump 620 and pumps diesel via line 650 to storage in system 11. When switch 590 activates pump 595, water is pumped to water reservoir storage tank 9. Fluid manifold 563 and fluid manifold 564 each have three filters to filter out ultra-fine solids. As discussed above, only one of these manifolds is in operation at any given time thus allowing the changing of filters without interrupting the operation of the fluid processor 570.

If gravity flow would permit diesel from line 650 to be introduced into diesel system 11, no vessel 610 is needed. However, if a pump is required, a pump 620 is connected near the bottom of tank 610 and discharges through line 650 as discussed above. Pump 620 is activated by a level switch 615 connected to tank 610 to maintain an appropriate level in tank 610 as discussed above and is deactivated by a level switch 616 to prevent the tank 610 from being totally drained. Normally fluid processor 580 and tank 610 (if tank 610 is used) are mounted in one physical enclosure 570.

The embodiment set forth herein are merely illustrative and do not limit the scope of the invention or the details therein. It will be appreciated that many other modifications and improvements to the disclosure herein may be made without departing from the scope of the invention or the inventive concepts herein disclosed. Because many varying and different embodiments may be made within the scope of the inventive concept herein taught, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed as invention is:

1. A cuttings washer system to process cuttings having mud and ultra-fines and diesel from shale shakers, mud cleaners, centrifuges, and mud tanks comprising:

mud saver means for separating mud from the cuttings, ultra-fines and diesel;

a first chute having an inlet and an outlet, said inlet of said first chute connected to said mud saver means to collect the cuttings, ultra-fines and diesel effluent of said mud saver;

a wash fluid source;

cutting washer means connected to said outlet of said first chute for receiving said effluent of said mudsaver and having first means for receiving wash fluid from said source and for washing the cuttings, ultra-fines and diesel from said mud saver means with said wash fluid;

a second chute having an inlet and an outlet, said inlet of said second chute connected to said cutting washer means to collect the cuttings;

shaker dryer means connected to said outlet of said second chute for mechanically separating the cuttings from said wash fluid and the ultra-fines and diesel;

a first pipe having an inlet and an outlet, said inlet of said first pipe connected to said shaker dryer means to collect said wash fluid and the ultra-fines and diesel;

a settling tank connected to said outlet of said first pipe, said settling tank having coalescing plates for separating the wash fluid from the diesel and having traps to collect the ultra-fines;

a second pipe having an inlet and an outlet, said inlet of said second pipe connected to said settling tank to collect said wash fluid from said settling tank, said wash fluid having entrained therein the diesel and remaining ultra-fines;

a fluid processor connected to said outlet of said second pipe and having first means for filtering any of the remaining ultra-fines and second means for separating the diesel from said wash fluid; and a third pipe having an inlet and an outlet, said inlet of said third pipe connected to said separated wash fluid in said fluid processor and said outlet of said third pipe connected to said first means of said cuttings washer means.

2. The system of claim 1, wherein there is further included a fourth pipe having an inlet and an outlet, said inlet of said fourth pipe connected to said separated wash fluid and said outlet of said fourth pipe connected to said mud saver means.

3. The system of claim 1, wherein said mud saver means includes an inlet chute, said inlet chute having a bypass, said bypass emptying into said first chute.

4. The system of claim 1, wherein said cuttings washer means includes a tank extendable to a position to receive the effluent cuttings from said first means of said cuttings washer means.

5. A method of processing drilling effluents having cuttings, diesel, drilling mud, water and ultrafines, comprising:

A. Preliminarily shaking and separating the cuttings from the mud;

B. Storing the mud;

C. Processing the mud;

D. Conveying the cuttings to a mud-saver;

E. Separating the cuttings of step D from remaining mud;

F. Storing the mud of step E;

G. Washing the cuttings with wash fluid;

H. Separating the cuttings from the wash fluid and diesel and ultrafines by mechanical shaking;

I. Storing the cuttings of step H;

J. Separating the wash fluid and diesel from the ultrafines;

K. Separating the mixture of step J into wash fluid and diesel;

L. Recycling the wash fluid to step G;

M. Storing the diesel of step K with the mud of step F.

6. The method of claim 5, wherein after step K there are included the steps of:

N. Storing the wash fluid.

7. A fluid processing system for effluent fluids having ultrafines, water and diesel from drilling operations, comprising:

a first pipe having an inlet connected to the effluent fluids and an outlet;

a settling tank having an inlet connected to said first pipe outlet, said settling tank having coalescing plates for separating the water and diesel and having traps to collect the ultrafines;

a second pipe having an inlet and an outlet, said inlet of said second pipe connected to said settling tank to collect the water, diesel and remaining ultrafines;

a fluid processor connected to said outlet of said second pipe and having first means for filtering any of the remaining ultrafines and second means for separating the diesel from the water; and first level means for controlling the level of the water in said fluid processor including first pumping means for pumping water from said fluid processor.

8. The system of claim 7, further including:

a third pipe having an inlet connected to said second means for collecting diesel and an outlet;

a storage tank connected to said outlet of said third pipe; and second level means for controlling the fluid level in said storage tank including second pumping means for pumping diesel oil from said storage tank.

* * * * *